United States Patent
Last et al.

(10) Patent No.: US 11,948,330 B2
(45) Date of Patent: *Apr. 2, 2024

(54) SYSTEMS AND METHODS FOR LOCALIZATION USING SURFACE IMAGING

(71) Applicant: Apple Inc., Cupertino, CA (US)

(72) Inventors: Matthew E. Last, San Jose, CA (US); Ricardo da Silveira Cabral, Zurich (CH); Daniel E. Potter, San Jose, CA (US); Paul Furgale, Adliswil (CH)

(*) Notice: Subject to any disclaimer, the term of this patent is extended or adjusted under 35 U.S.C. 154(b) by 0 days.

This patent is subject to a terminal disclaimer.

(21) Appl. No.: 17/406,369

(22) Filed: Aug. 19, 2021

(65) Prior Publication Data
US 2021/0383569 A1 Dec. 9, 2021

Related U.S. Application Data

(63) Continuation of application No. 15/762,378, filed as application No. PCT/US2016/052856 on Sep. 21, 2016, now Pat. No. 11,100,673.
(Continued)

(51) Int. Cl.
*G06T 7/73* (2017.01)
*G06F 18/22* (2023.01)
(Continued)

(52) U.S. Cl.
CPC ............. *G06T 7/74* (2017.01); *G06F 18/22* (2023.01); *G06F 18/24133* (2023.01);
(Continued)

(58) Field of Classification Search
CPC ........ G06V 10/28; G06V 10/52; G06V 10/54; G06V 10/764; G06V 20/54; G06V 20/588;
(Continued)

(56) References Cited

U.S. PATENT DOCUMENTS 3,113,308 A 12/1963 Stavis
3,833,906 A 9/1974 Augustine
(Continued)

FOREIGN PATENT DOCUMENTS

CN 101777253 7/2010
EP 2669633 12/2013
(Continued)

OTHER PUBLICATIONS

Shen, Yiping, et al. "A Fast Alternative for Template Matching: An ObjectCode Method." 2013 2nd IAPR Asian Conference on Pattern Recognition. IEEE, 2013. (Year: 2013).*
(Continued)

*Primary Examiner* — Vu Le
*Assistant Examiner* — Tracy Mangialaschi
(74) *Attorney, Agent, or Firm* — Polsinelli PC

(57) ABSTRACT

Implementations described and claimed herein provide localization systems and methods using surface imaging. In one implementation, a raw image of a target surface is captured using at least one imager. The raw image is encoded into a template using at least one transform. The template specifies a course direction and an intensity gradient at one or more spatial frequencies of a pattern of the target surface. The template is compared to a subset of reference templates selected from a gallery stored in one or more storage media. A location of the target surface is identified when the template matches a reference template in the subset.

20 Claims, 7 Drawing Sheets

Related U.S. Application Data

(60) Provisional application No. 62/232,337, filed on Sep. 24, 2015.

(51) Int. Cl.
| | |
|---|---|
| *G06F 18/2413* | (2023.01) |
| *G06V 10/52* | (2022.01) |
| *G06V 10/54* | (2022.01) |
| *G06V 10/764* | (2022.01) |
| *G06V 20/54* | (2022.01) |
| *G06V 20/56* | (2022.01) |
| *H04N 19/60* | (2014.01) |
| *H04N 23/56* | (2023.01) |

(52) U.S. Cl.
CPC ............ *G06V 10/52* (2022.01); *G06V 10/54* (2022.01); *G06V 10/764* (2022.01); *G06V 20/54* (2022.01); *G06V 20/588* (2022.01); *G06T 2207/10004* (2013.01); *G06T 2207/20048* (2013.01); *G06T 2207/20212* (2013.01); *G06T 2207/30244* (2013.01); *G06T 2207/30252* (2013.01); *H04N 19/60* (2014.11); *H04N 23/56* (2023.01)

(58) Field of Classification Search
CPC ...... G06K 9/6271; G06K 9/6215; G06T 7/74; G06T 2207/20048; G06T 2207/10004; G06T 2207/20212; G06T 2207/30252; G06T 2207/30244; H04N 5/2256; H04N 19/60; H04N 23/56; G06F 18/22; G06F 18/24133
See application file for complete search history.

(56) References Cited

U.S. PATENT DOCUMENTS

| | | | |
|---|---|---|---|
| 3,918,058 A | 11/1975 | Noyori et al. | |
| 3,974,500 A | 8/1976 | Goldfischer | |
| 4,050,071 A | 9/1977 | Clorfeine | |
| 4,107,680 A | 9/1978 | Kaplan | |
| 4,170,006 A | 10/1979 | Falk | |
| 4,349,897 A | 12/1982 | Boehme et al. | |
| 4,414,548 A | 11/1983 | Carpenter et al. | |
| 4,641,349 A | 2/1987 | Flom et al. | |
| 4,653,316 A | 3/1987 | Fukuhara | |
| 4,781,465 A | 11/1988 | Demachi et al. | |
| 4,980,633 A | 12/1990 | Roskoni | |
| 5,061,932 A | 10/1991 | Tribe et al. | |
| 5,189,425 A | 2/1993 | Dabbs | |
| 5,204,682 A | 4/1993 | Beasley | |
| 5,579,012 A | 11/1996 | Iwakuni et al. | |
| 5,751,241 A | 5/1998 | Lewiner et al. | |
| 6,492,938 B1 | 12/2002 | Alland | |
| 6,606,052 B1 | 8/2003 | Miyahara | |
| 6,778,125 B1 | 8/2004 | Stewart et al. | |
| 7,421,334 B2 | 9/2008 | Dahlgren et al. | |
| 7,508,337 B2 | 3/2009 | Morinaga et al. | |
| 7,545,313 B2 | 6/2009 | Okamura et al. | |
| 8,063,797 B1 | 11/2011 | Sonnabend et al. | |
| 8,332,132 B2 | 12/2012 | Groenhuijzen et al. | |
| 8,599,062 B2 | 12/2013 | Szajnowski | |
| 8,718,861 B1 | 5/2014 | Montemerlo et al. | |
| 8,941,739 B2 | 1/2015 | Yoo | |
| 8,994,928 B2 | 3/2015 | Shiraishi | |
| 9,024,809 B2 | 5/2015 | Testar | |
| 9,863,928 B1 | 1/2018 | Peterson et al. | |
| 10,247,816 B1 | 4/2019 | Hoffmann et al. | |
| 10,442,439 B1 | 10/2019 | Seo et al. | |
| 2001/0054976 A1 | 12/2001 | Sauer | |
| 2001/0056327 A1 | 12/2001 | Jin | |
| 2002/0176608 A1 | 11/2002 | Rose | |
| 2005/0002558 A1 | 1/2005 | Franke et al. | |
| 2006/0232444 A1 | 10/2006 | Lee | |
| 2007/0090991 A1 | 4/2007 | Yoshikawa et al. | |
| 2007/0142996 A1 | 6/2007 | Lee | |
| 2008/0071465 A1 | 3/2008 | Chapman et al. | |
| 2008/0122680 A1 | 5/2008 | Morinaga et al. | |
| 2009/0116697 A1 | 5/2009 | Shalaby et al. | |
| 2009/0201193 A1 | 8/2009 | Hilsebecher et al. | |
| 2009/0271101 A1 | 10/2009 | Relyea et al. | |
| 2010/0017128 A1 | 1/2010 | Zeng | |
| 2010/0131145 A1 | 5/2010 | Ryu et al. | |
| 2010/0131146 A1 | 5/2010 | Nardi et al. | |
| 2010/0131229 A1 | 5/2010 | Nardi et al. | |
| 2010/0176921 A1 | 7/2010 | Frederick | |
| 2010/0208937 A1 | 8/2010 | Kmiecik et al. | |
| 2010/0250056 A1 | 9/2010 | Perkins | |
| 2011/0060478 A1 | 3/2011 | Nickolaou | |
| 2012/0323431 A1 | 12/2012 | Wong et al. | |
| 2013/0342692 A1 | 12/2013 | Li et al. | |
| 2014/0005932 A1* | 1/2014 | Kozak ................... G01C 21/30 701/446 |
| 2014/0088860 A1 | 3/2014 | Poornachandran et al. | |
| 2014/0297092 A1 | 10/2014 | Delp | |
| 2014/0343842 A1* | 11/2014 | Ranganathan ......... G01C 21/30 701/472 |
| 2015/0069224 A1 | 3/2015 | Yoshimura | |
| 2015/0070207 A1 | 3/2015 | Millar et al. | |
| 2015/0285712 A1 | 10/2015 | Singh | |
| 2015/0291027 A1 | 10/2015 | Strasser et al. | |
| 2015/0334269 A1 | 11/2015 | Yokota et al. | |
| 2015/0344037 A1 | 12/2015 | Siegel et al. | |
| 2015/0369912 A1 | 12/2015 | Kishigami et al. | |
| 2016/0042644 A1 | 2/2016 | Velusamy | |
| 2016/0110997 A1 | 4/2016 | Ur et al. | |
| 2016/0133130 A1 | 5/2016 | Grimm et al. | |
| 2016/0133131 A1 | 5/2016 | Grimm et al. | |
| 2016/0209845 A1 | 7/2016 | Kojo et al. | |
| 2016/0274239 A1 | 9/2016 | Gupta et al. | |
| 2016/0321926 A1 | 11/2016 | Mayer et al. | |
| 2017/0010184 A1 | 1/2017 | Singh | |
| 2017/0219364 A1 | 8/2017 | Lathrop et al. | |
| 2017/0225688 A1 | 8/2017 | Milanese et al. | |
| 2017/0261315 A1 | 9/2017 | Yamaguchi et al. | |
| 2017/0344010 A1 | 11/2017 | Rander et al. | |
| 2018/0015931 A1 | 1/2018 | Berntorp et al. | |
| 2018/0121833 A1 | 5/2018 | Friedman et al. | |
| 2018/0174454 A1 | 6/2018 | Tiwaree et al. | |
| 2018/0276832 A1 | 9/2018 | Aikin | |
| 2018/0283895 A1 | 10/2018 | Aikin | |
| 2019/0107400 A1 | 4/2019 | Zavodny et al. | |

FOREIGN PATENT DOCUMENTS

| | | |
|---|---|---|
| EP | 2884299 | 6/2015 |
| GB | 2148651 | 5/1985 |
| WO | WO 2009/147406 | 12/2009 |
| WO | WO 2010/134824 | 11/2010 |
| WO | WO 2012/062764 | 5/2012 |
| WO | WO 2012/136494 | 10/2012 |
| WO | WO 2013/127666 | 9/2013 |
| WO | WO 2014/139821 | 9/2014 |
| WO | WO 2017/208670 | 12/2017 |

OTHER PUBLICATIONS

Condliffe, Jamie, "Road Trip Planner Lets You Choose A Route With the Best Weather." Jun. 19, 2012, https://gizmodo.com/5919495/5919495/road-trip-planner-lets-you-choose-a-route-with-the-best-weather, accessed Mar. 21, 2018.

Google Play, "Weather Route—Free," App description, https://play.google.com/store/apps/details?id=com.voyagegames.weatherroute&hl=en, accessed Mar. 21, 2018.

Garun, Natt, "Weather Channel's road trip planner helps predict the forecast along your drive," Jun. 19, 2012, https://www.digitaltrends.com/home/weather-channels-road-trip-planner/, accessed Mar. 21, 2018.

App Store Preview, "inRoute Route Planner," Carob Apps, LLC, https://itunes.apple.com/us/app/inroute-intelligent-route/id703796787?mt=8, accessed Mar. 21, 2018.

(56) References Cited

OTHER PUBLICATIONS

Shen et al., "A Fast Alternative for Template Matching: An Object Code Method," 2013 Second IAPR Asian Conference on Pattern Recognition, IEEE, Nov. 5, 2013, pp. 425-429.

Nam, "Application of Novel Lateral Tire Force Sensors to Vehicle Parameter Estimation of Electric Vehicles," Sensors, 2015. vol. 15, pp. 28385-28401.

Coyle, John, "Jaguar Land Rover's 'Pothole Alert' Warns About Hated Hazard," Jun. 10, 2015, http://www.motorauthority.com/news/1098673_jaguar-land-rovers-pothole-alert-warns-about-hated-hazard, accessed Sep. 12, 2016.

Revolta, Doug, "Pothole detection system showcased by Jaguar Land Rover," Jun. 17, 2015, http://www.autocar.co.uk/car-news/new-cars/pothole-detection-system-showcased-jaguar-land-rover, accessed Jun. 18, 2015.

Furgale et al., "Toward Automated Driving in Cities using Close-to-Market Sensors: An overview of the V-Charge project," 2013 IEEE Intelligent Vehicles Symposium (IV) Jun. 23-26, 2013, 8 pages.

Kozak et al., "Ranger: A Ground-facing Camera-based Localization System for Ground Vehicles," 2016 IEEE/ION Position, Location and Navigation Symposium (PLANS), Apr. 11, 2016, pp. 170-178.

Fang et al., "Ground-Texture-Based Localization for Intelligent Vehicles," IEEE Transactions on Intelligent Transportation Systems, vol. 10, No. 3, Sep. 2009, pp. 463-468.

Fang et al., "Ground Texture Matching based Global Localization for Intelligent Vehicles in Urban Environment," Proceedings of the 2007 IEEE Intelligent Vehicles Symposium Jun. 13-15, 2007, 6 pages.

Baumgartner et al., "Acceleration-independent along-track velocity estimation of moving targets," *IET Radar, Sonar, and Navigation*, 2010, vol. 4, No. 3, pp. 474-487.

\* cited by examiner

SYSTEMS AND METHODS FOR LOCALIZATION USING SURFACE IMAGING

CROSS-REFERENCE TO RELATED APPLICATIONS

This application is a continuation of U.S. patent application Ser. No. 15/762,378, filed Mar. 22, 2018, and entitled "Systems and Methods for Localization using Surface Imaging," which is a 371 of PCT Patent Application Serial No. PCT/US2016/052856, filed Sep. 21, 2016, and entitled "Systems and Methods for Localization using Surface Imaging," which claims priority to U.S. Provisional Application Ser. No. 62/232,337, filed Sep. 24, 2015, and entitled "Systems and Methods for Localization using Surface Imaging," each of which is specifically incorporated herein by reference in its entirety.

FIELD

Aspects of the present disclosure relate to location identification and mapping and more particularly to systems and methods for determining a location by matching compressed encoded surface structural patterns.

BACKGROUND

Operation of autonomous devices, including robots, unmanned aerial vehicles, automobiles, and the like, often relies on a localization of the device relative to a notion of the environment, such as a map. Simultaneous localization and mapping (SLAM) techniques used with such devices are directed at generating and updating a map of an unknown environment while simultaneously tracking a location of the device within it. Such SLAM techniques, however, are tailored to available computational and sensor input resources, and as such, the ability of conventional autonomous devices to obtain sufficient information to navigate and make decisions within complex and fluctuating environments is often hindered by prohibitive costs, high data bandwidth requirements, and other fidelity or computational deficiencies. It is with these observations in mind, among others, that various aspects of the present disclosure were conceived and developed.

SUMMARY

Implementations described and claimed herein address the foregoing problems by providing localization systems and methods using surface structural patterns. In one implementation, a raw image of a target surface is captured using at least one imager. The raw image is encoded into a template using at least one transform. The template specifies a course direction and an intensity gradient at one or more spatial frequencies of a pattern of the target surface. The template is compared to a subset of reference templates selected from a gallery stored in one or more storage media. A location of the target surface is identified when the template matches a reference template in the subset.

In another implementation, at least one imager is mounted on a vehicle and configured to capture a raw image of a target surface along a path of travel of the vehicle. One or more storage media store a set of reference templates, and each of the reference templates corresponds to a road surface with a known location. At least one processor determines a location of the vehicle by matching a template to one of the reference templates. The template is generated by encoding the raw image using at least one transform.

In another implementation, a template encoded from a raw image of a target surface using at least one transform is received. The raw image is captured using at least one imager, and the template specifies a course direction and an intensity gradient at one or more spatial frequencies of a pattern of the target surface. The template is compared to a subset of reference templates selected from a gallery stored in one or more databases. A location of the target surface is identified when the template matches a reference template in the subset.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the presently disclosed technology relate to systems and methods for localization and navigation using surface structural patterns. Generally, an optical system captures a raw image of a texture pattern of a target surface. A localizer compresses and encodes the raw image into a template for efficient storage, fast comparison, and spatial registration with a gallery of reference templates, each corresponding to a known location. By matching the template with one of the references templates, a location of the target surface is determined.

In one particular aspect, the optical system is mounted on a vehicle, such as an automobile, and captures a raw image of a target surface on a road as the vehicle moves along a path of travel. The localizer encodes the raw image into a template using at least one transform, such as a log Gabor feature encoder. The template is thus in a form for comparison to a gallery of reference templates, each of which corresponds to a known location on a road. The template is aligned to the reference templates using registration optimization, such as hamming distance minimization or an application of correlation theorem. Road surfaces include vast amounts of unique information (e.g., hundreds of bits in 30 cm$^2$ patches), permitting a match of the template to one of the reference templates with a high level of accuracy. A location of the vehicle, along with other travel information, such as a direction of travel, a speed of travel, and the like, may be determined by registering the template with one of the reference templates.

The various systems and methods disclosed herein generally provide for localization and navigation using surface structural patterns. The example implementations discussed herein reference vehicle localization and navigation using road surface patterns. However, it will be appreciated by those skilled in the art that the presently disclosed technology is applicable in other localization, navigation, and mapping contexts and to other autonomous devices, including, without limitation, robots, unmanned aerial vehicles, and other vehicles or devices, as well as to other types of target surfaces, such as walls, sidewalks, paths, and other surfaces with high amounts of unique texture or structure information.

Figure 1:
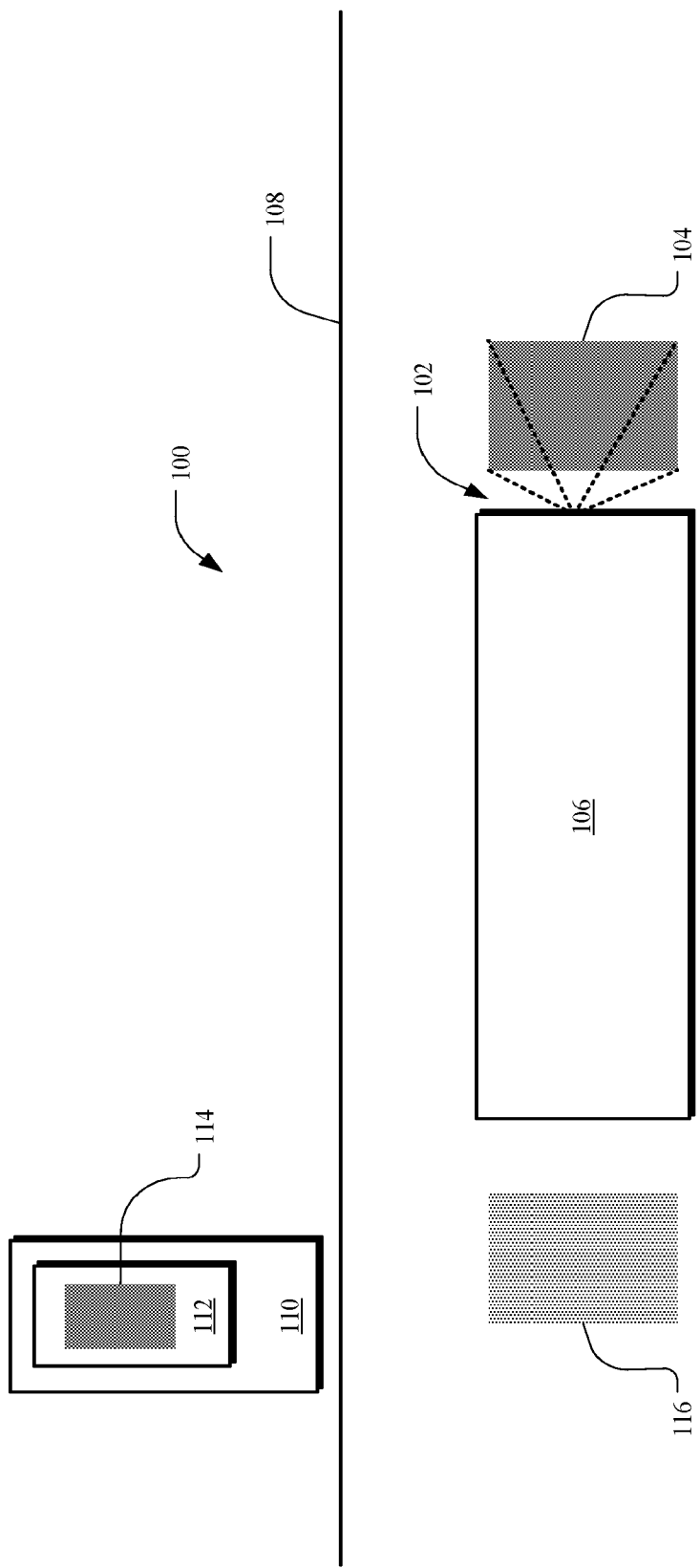
FIG. 1 is a diagram of an example localization system using road surface images to determine a location of a vehicle.

To begin a detailed description of an example localization system 100 using road surface images, reference is made to FIG. 1. In one implementation, a localizer 102 captures one or more raw images of a target surface 104 to determine travel information of a vehicle 106 relative to a notion of the environment in which the vehicle 106 travels along a road 108.

The target surface 104 includes contrast information in the form of a pattern of dark and light features, corresponding to the surface texture. Small regions of the contrast information include vast amounts of identifiable and registrable information. For example, the target surface 104 may be a 30 cm by 30 cm patch including potentially hundreds of bits of unique information for localization of the vehicle 106. The localizer 102 thus uses image-based random patterns of surfaces on the road 108 and/or 3-dimensional surface morphology of the surfaces on the road 108 as a source of localization for the vehicle 106. Localization consists of determining the current pose of the vehicle 106 within an environment in a precise manner.

The localizer 102 captures a raw image of the target surface 104 using an imaging system. In one implementation, the target surface 104 is disposed under the vehicle 106 during image capture. Stated differently, the localizer 102 captures raw images of the target surface 104 along the path of travel as the vehicle 106 passes over the target surface 104. By capturing the raw image of the target surface 104 beneath the vehicle 106, the localizer 102 may obtain a better quality image through control of illumination of the target surface 104, external image capture factors, and/or the like. It will be appreciated, however, that the target surface 104 may be imaged in front of the vehicle 106, behind the vehicle 106, and/or anywhere in a vicinity of the vehicle 106.

In one implementation, the localizer 102 encodes the raw image of the target surface 104 into a template in a form for comparison and taking into account the lighting conditions of the environment in which the target surface 104 is disposed as well as any other image capture phenomena capable of altering the raw image or otherwise decreasing the fidelity of registration. The localizer 102 encodes and compresses the raw image into a template of the target surface 104 to facilitate storage and/or comparison and spatial registration with a gallery 112 of reference templates 114. The gallery 112 includes reference templates 114 for surfaces in road networks and other drivable regions within a geographical scale, such as a global scale, a regional scale, a country scale, a state scale, a city scale, a local scale defined by a radius from a central point (e.g., a charging station 110), and/or the like. The localizer 102 may cache a portion or an entirety of the gallery 112 in memory, access the gallery 112 over a network, and/or the like.

The localizer 102 encodes and compresses the raw image of the target surface 104 into the template using at least one transform, including, but not limited to, a feature encoder with a log Gabor base filter function, a feature encoder with a Haar transform base filter function, a feature encoder with a Fourier transform base filter function, a feature encoder with a discrete cosine transform base filter function, a signal definition using a Histogram of Gradient filter, a signal definition using a Local Binary Pattern filter, and/or feature encoders with other base filter functions or signal definitions filters. The template of the target surface 104 may be defined through optimization and classification, which relate to the intrinsic information content of the target surface 104. For example, a phase of the template may be used as a robust signal for comparison to the gallery 112 of reference templates 114.

In one implementation, the raw image of the target surface 104 is encoded and compressed into a binary template, which expresses the contrast information of the target surface 104 using a series of two symbols (e.g., a series of 0's and 1's), using a base set of first order log Gabor feature encoders. The binary template of the target surface 104 indicates a course direction and an intensity gradient at one or more spatial frequencies of a pattern of the target surface. The binary template of the target surface 104 may be used for comparison to the gallery 112 of reference templates 114, which are each stored in a form for comparison. For example, each of the reference templates 114 may be stored as binary templates for comparison.

In one implementation, templates of the road 108 that are generated as the vehicle 106 moves along the path of travel are used to update the gallery 112. The localizer 102 may provide new templates or updates to the reference templates 114 for storage in the gallery 112. The localizer 102 may communicate with the gallery 112 over a network, via the charging station 110, and/or using other wired or wireless connections. Because the templates are compressed, as described herein, the data rate to send the new and updated templates to the gallery 112 is low.

To determine travel information for the vehicle 106, including localization, in one implementation, a subset of the reference templates 114 is identified from the gallery 112 and stored in memory of the localizer 102 for comparison to templates generated during travel. The subset of reference templates 114 may be identified based on a general location of the vehicle 106, a previously known location the vehicle 106, a geographical area in which the vehicle 106 is located, and/or the like.

The general location of the vehicle 106 may be determined using Global Positioning System (GPS), Lidar, radar, longer throw imaging, low resolution road surface matching, and/or other location services. In one implementation, the localizer 102 uses a low-resolution scale of the template of the target surface 104 to identify a subset of the reference templates 112 and uses a high resolution scale of the template of the target surface 104 to match one of the reference templates 112 for localization.

The previously known location may correspond to one or more previously localized segments 116 along the path of travel of the vehicle 106 on the road 108, a stopping location of the vehicle 106 (e.g., where the vehicle 106 was turned off or connected to the charging station 110), and/or the like. In one implementation, the localizer 102 performs a frequent sampling of the road 108 at low accuracy. Stated differently, the localizer 102 discards part of the imaging data for the target surface 104 and performs a low accuracy match to the reference template 114. Where the localizer 102 determines that the vehicle 106 is traveling along a sequence based on the one or more previously localized segments 116, the localizer 102 determines the location of the vehicle 106 with a high level of confidence based on a low accuracy match of the template for the target surface 104 to the reference template 114 following next in the sequence. The part of the imaging data discarded may be low frequency data, high frequency data, and/or the most valuable data determined based on a weighted mutual entropy of the imaging data.

In one implementation, the geographical area in which the vehicle 106 is located may correspond to an average distance range of an electric vehicle battery. The vehicle 106 connects with the charging station 110 to charge a battery of the vehicle 106. The charging station 110 may store the gallery 114 with the reference templates 112 corresponding to surfaces within the average distance range of the vehicle battery from the charging station 110. While the vehicle 106 is charging, the localizer 102 retrieves the gallery 112 from the charging station 110 and stores the gallery 112 in memory for comparison during travel. The gallery 112 may be updated via a vehicle 106 connection with the charging station 110 and/or with information obtained over a network.

The localizer 102 may use registration optimization, including, but not limited to, hamming distance minimization, application of correlation theorem, and/or the like, to align the template of the target surface 104 to the reference templates 114. The localizer 102 compares the template of the target surface 104 to the reference templates 114 selected from the gallery 112 with a high registration speed. For example, the localizer 102 may perform millions of comparisons and registrations per second.

By registering the template of the target surface 104 with one of the reference templates 114, the localizer 102 determines a location of the target surface 104 and other travel information with a high level of accuracy (e.g., on a submillimeter scale). In one implementation, the matching accuracy is tunable based on location, operational parameters of the vehicle 106, and/or the like. For example, the localizer 102 may use a higher matching accuracy when the vehicle 106 is located within an urban area or turning and use a lower matching accuracy when the vehicle 106 is located in a rural area or when the vehicle 106 is traveling along a straight path (e.g., on a highway).

Through the registration of the template of the target surface 104 with one of the reference templates 112, travel information for the vehicle 106 is determined. Such travel information may include, without limitation, a geographical location of the vehicle 106, an orientation of the vehicle 106 relative to the target surface 104, a pitch and altitude of the vehicle 106, an optical flow of the vehicle 106, and/or the like. The travel information may be overlaid on a map (e.g., a 3-D map), such that the location, orientation, pitch and altitude, and optical flow are provided relative to a notion of the environment in which the vehicle 106 travels.

The geographical location of the vehicle 106 may be determined by matching the template of the target surface 104 to one of the reference templates 112, each of which corresponding to a known location on the map. In one implementation, the geographical location is provided as an x-y position on a map.

The orientation of the vehicle 106 corresponds to a horizontal angle of the vehicle 106 relative to the target surface 104, for example, resulting from the vehicle 106 changing lanes or turning. In one implementation, the orientation of the vehicle 106 is determined through an alignment of the template of the target surface 104 with the reference template 114 through registration, which may be supplemented with additional information captured by the localizer 102 using one or more sensors, such as a compass.

The pitch corresponds a vertical angle of the vehicle 106 relative to a plane of the target surface 104, and the altitude corresponds to a height of the vehicle 106 above or below the plane of the target surface 104. The pitch and altitude of the vehicle 106 may vary, for example, by the vehicle 106 traveling over a bump or hitting a road deformity, such as a pothole. In one implementation, the pitch and/or altitude of the vehicle 106 may be determined by skewing the template of the target surface 104 until it matches against the reference template 114 during registration and/or using 3-dimensional morphology of the target surface 104 obtained through triangulation of the raw images captured using structured light.

The optical flow provides a direct measurement of the velocity of the vehicle 106 as it moves along the path of travel on the road 108. The optical flow may further provide a direct measurement of friction of the road 108 by comparing the velocity measured by the localizer 102 with a distance measured using wheel motion of the vehicle 106. In one implementation, the optical flow is determined by measuring how fast the vehicle 106 traverses over the target surface 104 along the road 108.

The localizer 106 may communicate with other subsystems of the vehicle 106 to provide the travel information, including the location of the vehicle 106, for use with other layers of semantic information (e.g., road network information, vehicle and pedestrian traffic information, weather information, etc.) in decision-making support for controlling operations of the vehicle 106. The localizer 106 may further output the travel information for display on a user interface, with which a driver or other passenger may interact.

In one implementation, the localizer 102 utilizes the road surfacing imaging in replace of or complementary to other localization techniques. Localization using road surface imaging covers unique environmental conditions where other localization techniques may be inadequate. For example, conditions where a view from the vehicle 106 is blocked by surrounding vehicles, such as semi-trucks, inhibit localization through Lidar, longer throw imaging, or radar. Weather conditions, such as fog, may similarly inhibit such localization techniques. GPS and other space-based navigation systems may suffer from fidelity issues in urban areas or other areas where line of sight to the necessary satellites is blocked. In these situations, the localizer 102 may rely on road surface imaging as a primary localization source and such localization techniques as secondary sources. It will be appreciated, however, that in some scenarios, road surface imaging may be used to supplement other localization techniques.

Figure 2:
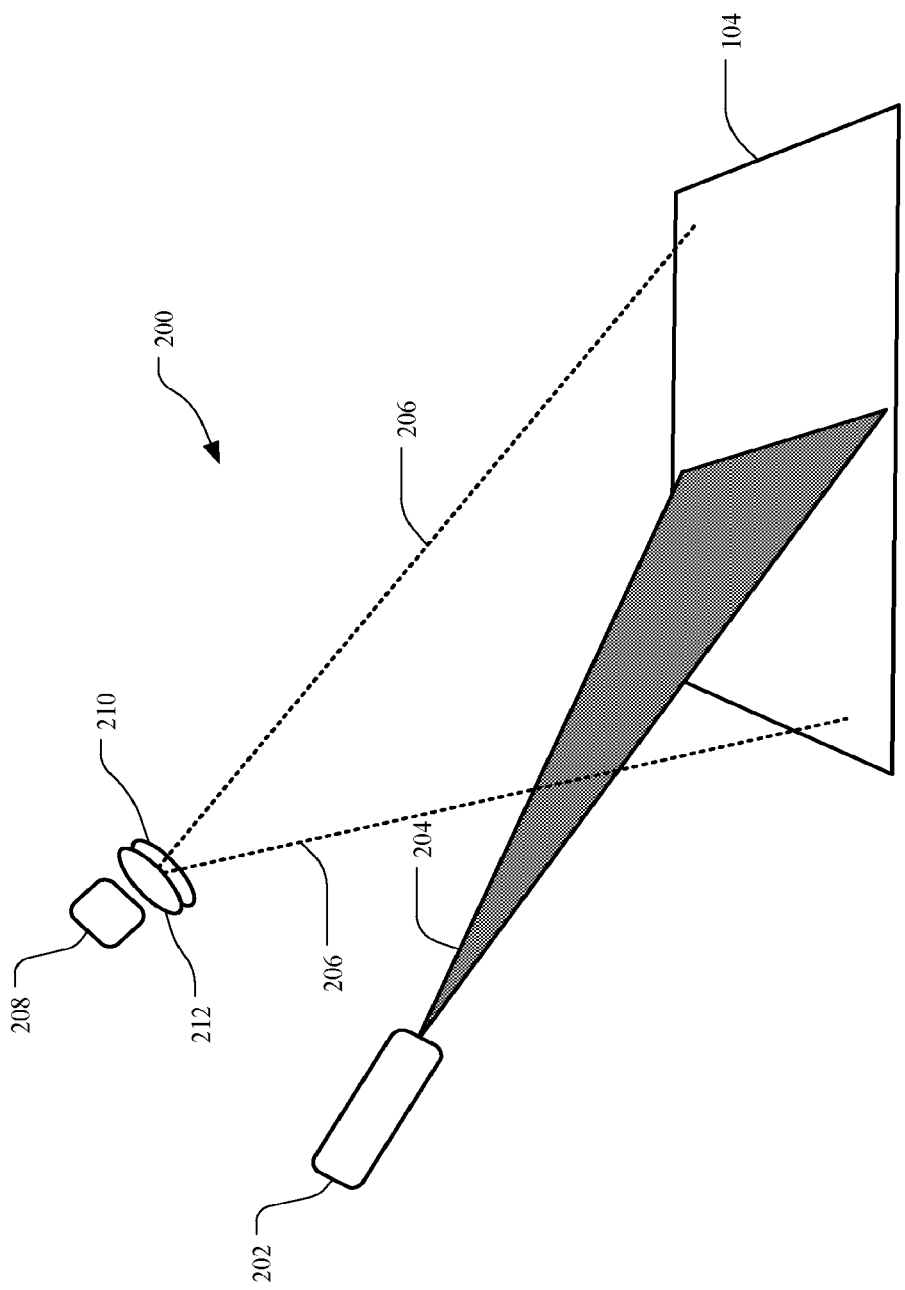
FIG. 2 illustrates an example imaging system for capturing a raw image of a target surface.

Referring to FIG. 2, an example imaging system 200 for capturing a raw image of the target surface 104 is shown. In one implementation, the imaging system 200 includes at least one light source 202 configured to emit light 204 for illuminating the target surface 104 and at least one imager 208 configured to generate the raw image of the target surface 104 from returns 206 from the target surface 104. In some implementations, the imaging system 200 does not include the light source 202.

The returns 206 may pass through various optical elements, such as a polarizer 210, a filter 212, and/or the like, depending on properties of the transform for encoding the raw image captured using the imaging system 200. Sunlight or other ambient light, as well as other background light, may create returns in the imager 208, which may contaminate the raw image. As such, in one implementation, the light source 202 is a high power, pulsed illuminator, which may be time synchronized with the imager 208 exposure to reduce the illumination time. Background light, including ambient light and light from other external sources, is rejected using such high power, pulsed illumination. Further, the short illumination time prevents any eye safety hazards for other drivers on the road 108 caused by the light source 202.

Alternatively or additionally, the imaging system 200 may reduce background light using correlated double sampling where the imager 208 takes back-to-back exposures of the target surface 104. The first exposure is with the light source 202 off, such that only ambient light is collected by the imager 208. The second exposure includes the light 204 emitted by the light source 202. Using these two exposures, the background light is subtracted from the image data of the second exposure, leaving the contribution of the light 204 in the raw image. Correlated double sampling provides uniform and controllable illumination conditions for capture of the target surface 104 without the variability of background light, thereby facilitating encoding and registration of the template for the target surface 104.

The light source 202 may be configured to emit the light 204 and the imager 208 to capture the returns 206 depending on properties of the transform for encoding the raw image captured using the imaging system 200. For example, the light source 202 and the imager 208 may be configured to capture the raw image of the target surface 104 using structured light, in multi-wavelength space, based on wavelength differential, using polarization, using light in the visible spectrum, using light in the near infrared (NIR) spectrum, using stereoscopic methods, and/or the like.

Similarly, a capture rate of the imaging system 200 may vary depending on localization of the vehicle 106 and operational parameters of the imaging system 200. In one implementation, the capture rate of the imaging system 200 is proportional to a velocity of the vehicle 106, a field of view, a location and/or the like. For example, the imaging system 200 may capture raw images at a higher rate where the vehicle 106 is localized to an area that does not have corresponding reference templates 114 mapped in the gallery 112. Conversely, the imaging system 200 may capture raw images at a lower rate where the vehicle 106 is localized to a previously known patch of road. The localizer 102 may track the location and trajectory of the vehicle 106 using integrated velocity data between relatively sparse localization through road surface imaging.

Figure 3:
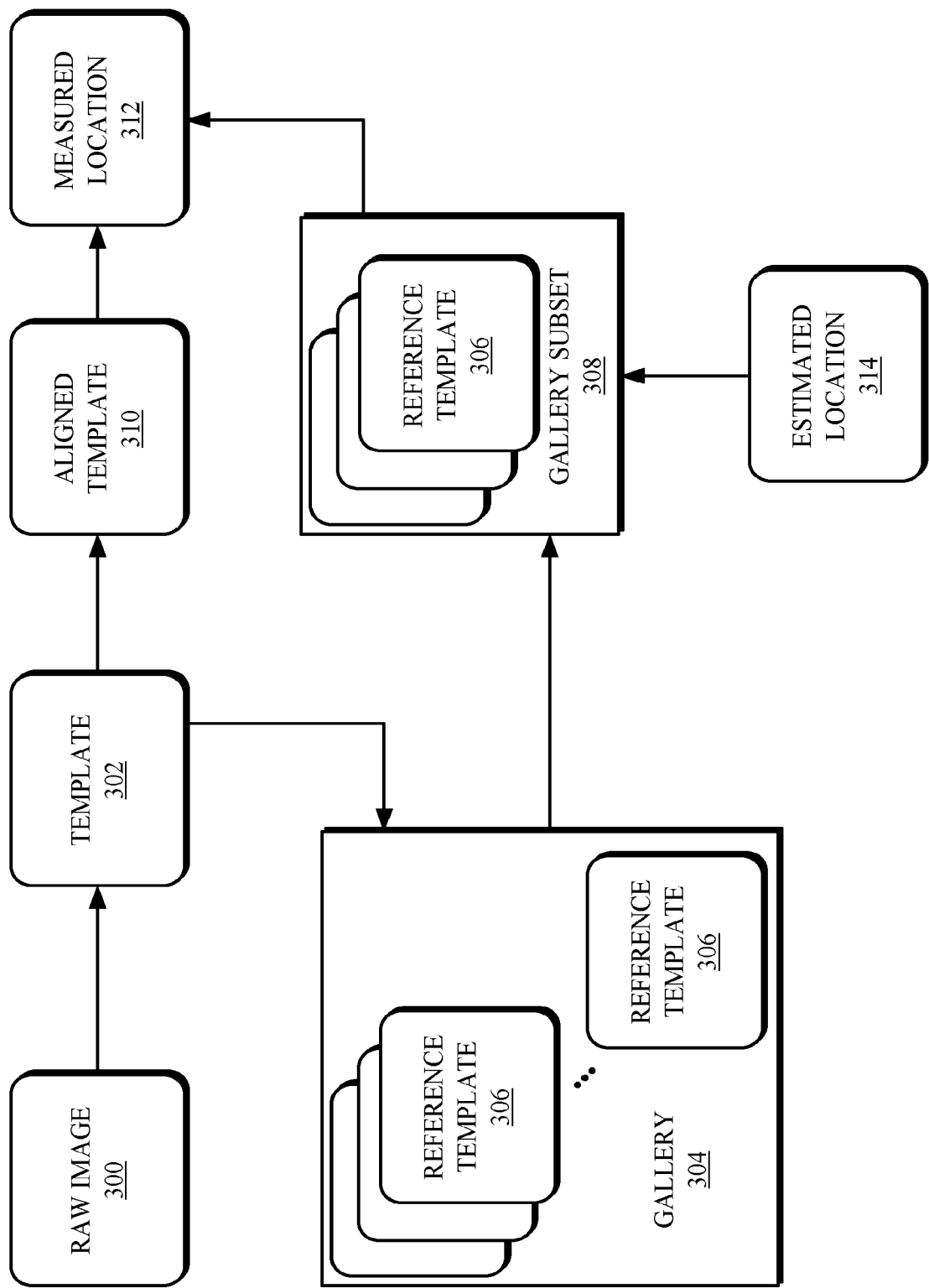
FIG. 3 is a block diagram of an example system for identifying a location of a target surface.

Turning to FIG. 3, an example system for identifying a location of a target surface is illustrated. In one implementation, a raw image 300 of a target surface is captured using an imaging system. The target surface may be, without limitation, a road surface, a wall surface, a sidewalk surface, a path surface, a landmark surface, or other surfaces with high amounts of unique texture or structure information.

The raw image 300 is encoded into a template 302 using one or more transforms, including, but not limited to, a feature encoder with a log Gabor base filter function, a feature encoder with a Haar transform base filter function, a feature encoder with a Fourier transform base filter function, a feature encoder with a discrete cosine transform base filter function, a signal definition using a Histogram of Gradient filter, a signal definition using a Local Binary Pattern filter, a scale invariant feature transform, a notch filter, and/or feature encoders with other base filter functions or signal definitions filters. In one implementation, a set of first order log Gabor feature encoders is applied to the raw image 300. The set of first order log Gabor feature encoders simultaneously analyzes the space and frequency characteristics of the raw image 300, thereby transforming the raw image 300 into the template 302 with a feature representation of the surface texture for registration.

In one implementation, the template 302 is a binary template, which expresses the contrast information of the raw image 300 using a series of two symbols (e.g., a series of 0's and 1's). The binary template will be nominal in size (e.g., 10,000 bits) facilitating storage and transmission of the template 302. Here, the template 302 indicates a course direction and an intensity gradient at one or more spatial frequencies of a pattern of the target surface. The template 302 may be used for comparison to a gallery 304 of reference templates 306, which each correspond to a surface with a mapped location. The reference templates 306 are encoded and compressed for storage in a manner that mirrors the template 302, for example, as highly compressed binary templates.

The gallery 304 may be populated with the reference templates 306 using one or more vehicles. For example, one or more calibration vehicles may slowly traverse various surfaces to generate an initial set of reference templates 306 that may be updated over time. As another example, the reference templates 306 may be obtained through crowd sourcing using calibration markers. Templates generated by vehicles for the same surface may be combined to build a statistical accuracy through the use of a plurality of templates (e.g., 10-20) for the same surface. As the surfaces may change over time, the reference templates 306 may be updated in similar manners. New and/or updated reference templates 306 may be input to the gallery 304 via a variety of connections discussed herein, including by connecting with a charging station, over a network, and/or the like. The template 302 is added to the gallery 304 in such manners and contexts.

In one implementation, a gallery subset 308 of the reference templates 306 is identified from the gallery 304 for comparison to the template 302 for localization. The gallery subset 308 may include one, some, or all of the reference templates 306. In one implementation, the reference templates 306 included in the gallery subset 308 are identified based on an estimated location 314 of the target surface. The estimated location 314 may be based on a general location of the vehicle, a previously known location the vehicle, a geographical area in which the vehicle is located, and/or the like.

In one implementation, the gallery subset 308 is searched over scale, rotation, and translation space to register the template 302 with one of the reference templates 306. In other implementations, registration optimization, including, but not limited to, hamming distance minimization, application of correlation theorem, and/or the like, are used to align the template 302 to the reference templates 306. Stated differently, an aligned template 310 may be generated from the template 302 using registration optimization.

In one implementation, a hierarchal matching approach is used with levels corresponding to one or more features of varying sensitivity to rotation, scale, and translation. A first level may search features that are less sensitive to rotation, scale, and/or translation to provide a general area. For example, a number of holes in the target surface may be defined as a topological encoder method, which is rotation, scale, and translation invariant. One or more selected the reference templates 306 matching the number of holes of the template 302 may be identified. A second level normalizes the template 302 into the aligned template 310 for comparison to the one or more selected reference templates 306 with a higher level of accuracy and therefore sensitivity to rotation, scale, and translation.

To reduce computational overhead by permitting a direct match with one of the reference templates 306, the aligned template 310 may be generated with rotation, scale, and translation invariance. In one implementation, the raw image 300 may be captured using structured light illumination to provide the aligned template 310 with scale invariance. Using the known properties of the imaging system, including a distance from the imager to the target surface, the raw image 300 and/or the template 302 may be scaled by a fixed scale factor to fit the geometry of the imaging system corresponding to the reference templates 306. In other implementations, the aligned template 310 may be generated with rotation and translation invariance using other image data and/or date captured using other sensors. For example, a compass and/or a direction of the sun provide an orientation of the vehicle when the raw image 300 was captured, and GPS provides a trajectory of the vehicle along a path of travel when the raw image 300 was captured. Using such information, the raw image 300 may be rotated to match a direction of capture of the reference templates 306 and/or to a normalized direction (e.g., with north oriented at a top of the raw image 300). The raw image 300 may be similarly translated based on the data providing the orientation of the vehicle when the raw image 300 was captured. Thus, the aligned template 310 may be oriented for comparison to the gallery subset 308 with rotation, scale, and translation invariance.

The aligned template 310 is compared to the reference templates 306 in the gallery subset 308 with a high registration speed. By matching the aligned template 310 with one of the reference templates 306, a measured location 312 of the target surface, as well as other travel information, is determined with a high level of accuracy (e.g., on a sub-millimeter scale). Such travel information may include, without limitation, a geographical location, an orientation, a pitch and altitude, an optical flow, and/or the like.

Figure 4:
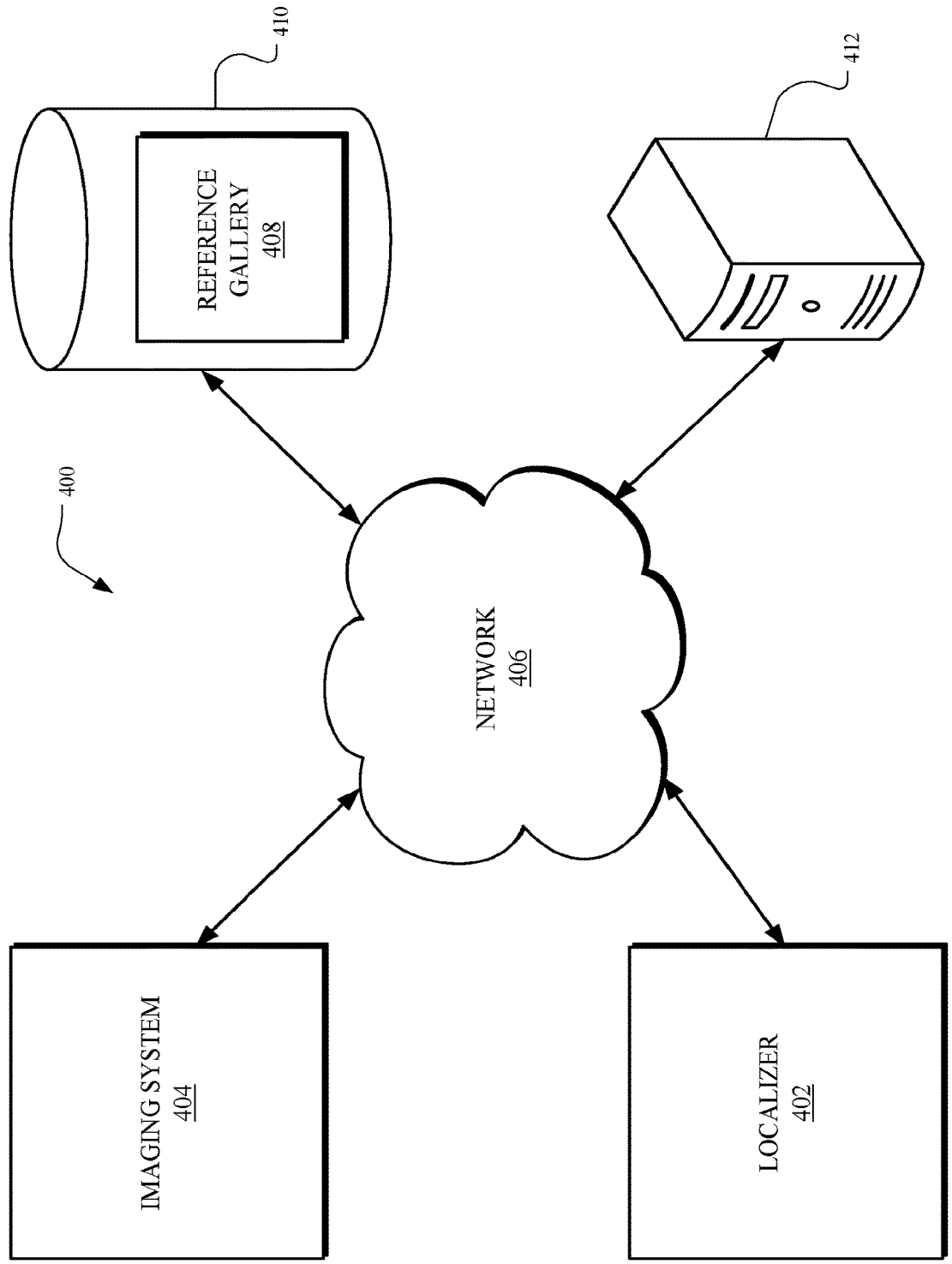
FIG. 4 is an example localization system, including a localizer which may run on a computer server, computing device, or other device coupled with a network, for localization using surface imaging.

FIG. 4 is an example localization system 400, including a localizer 402 which may run on a computer server, computing device, or other network device, for localization using surface imaging. The localizer 402 accesses and interacts with an imaging system 404 and/or a reference gallery 408 directly or via a network 406. In one implementation, the localizer 402, the imaging system 404, and one or more storage media 410 storing the reference gallery 408 are deployed locally within the vehicle 106. For example, the reference gallery 408 may be retrieved from the charging station 110 and stored in the storage media 410. In another implementation, the imaging system 404 is deployed in the vehicle 106 and communicates raw images to the localizer 402 over the network 406 for localization of the vehicle 106, and the localizer 402 communicates the location to the vehicle 106. In still another implementation, the localizer 402 is deployed within the vehicle 106 and retrieves a subset of reference templates from the reference gallery 408 stored in the storage media 410 over the network 406 for comparison. It will be appreciated by those skilled in the art that these implementations illustrate a few example configurations of the systems 100 and 400 and that other configurations are contemplated.

The network 406 is used by one or more computing or data storage devices, such as the storage media 410 in the form of one or more databases, for implementing the localization system 400. A driver or other passenger may access and interact with the localization information using a user device communicatively connected to the localizer 402 directly or via the network 406. The user device is generally any form of computing device, such as a computer, mobile device, smartphone, tablet, multimedia console, vehicle interface console, and/or the like.

A server 412 may host the system 400. The server 412 may also host a website or an application, such as the localizer 402 that users visit to access the system 400. The server 412 may be one single server, a plurality of servers with each such server being a physical server or a virtual machine, or a collection of both physical servers and virtual machines. In another implementation, a cloud hosts one or more components of the system 400. One or more vehicles 106, the localizer 402, the imaging system 404, user devices, the server 412, and other resources, such as the database 410, connected to the network 406 may access one or more other servers for access to one or more websites, applications, web services interfaces, and/or the like that are used for localization, mapping, and/or other services. The server 412 may also host a search engine that the system 400 uses for accessing and modifying information used for localization and mapping.

Figure 5:
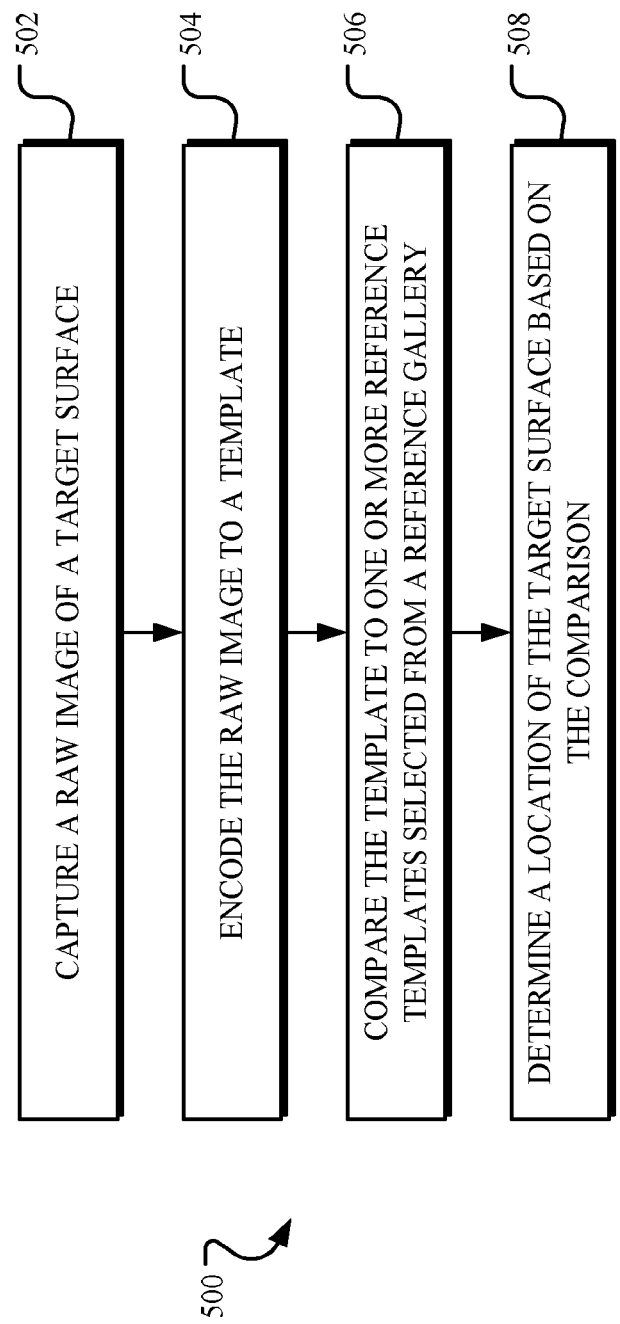
FIG. 5 illustrates example operations for identifying a location of a target surface.

FIG. 5 illustrates example operations 500 for identifying a location of a target surface. In one implementation, an operation 502 captures a raw image of a target surface using at least one imager. The imager may be mounted on a vehicle to capture the raw image of the target surface along a path of travel of the vehicle. At least one light source may be time synchronized with the imager and configured to illuminate the target surface.

In one implementation, an operation 504 encodes the raw image into a template using at least one transform. The operation 504 may further compress the raw image into the template. The template may be a binary template encoded based on a set of first order log Gabor feature encoders. In one implementation, the template specifies a course direction and an intensity gradient at one or more spatial frequencies of a pattern of the target surface. The template may be received over a network from at least one computing unit, such as a processor, of a vehicle.

An operation 506 compares the template comparing the template to a set of reference templates selected from a gallery stored in one or more storage media. Each of the reference templates corresponds to a surface, such as a road surface, with a mapped or otherwise known location. The storage media may include one or more databases accessible over a network. The set of reference templates may be selected from the gallery based on a previous location of the vehicle determined using one or more previously captured raw images, retrieved from the gallery over the network, retrieved from a charging station, and/or the like. In one implementation, the template is aligned to the set of reference templates for comparison using registration optimization, such as hamming distance minimization, an application of correlation theorem, and/or the like.

An operation 508 determines a location of the target surface based on the comparison. In one implementation, the operation 508 identifies the location of the target surface when the template matches a reference template in the set of reference templates. The operation 508 may communicate the location of the target surface to at least one computing unit of a vehicle. The gallery may be updated by storing the template in the storage media.

Figure 6:
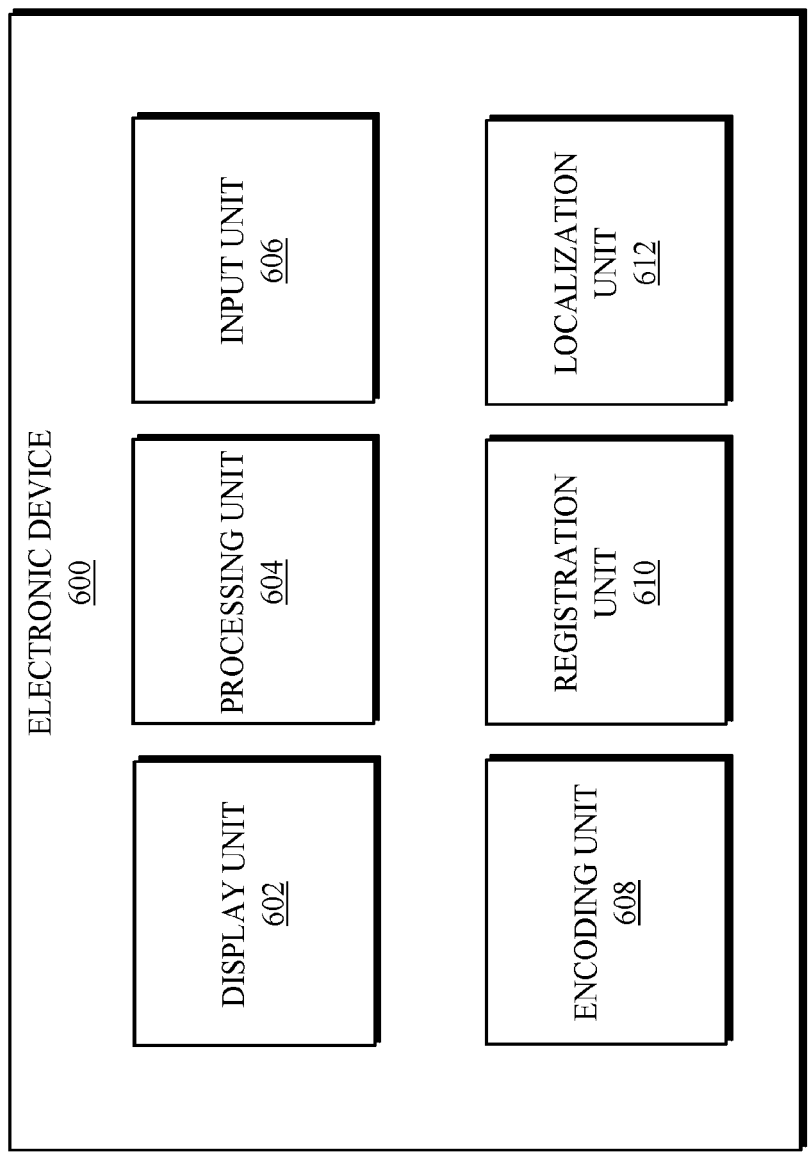
FIG. 6 is a functional block diagram of an electronic device including operational units arranged to perform various operations of the presently disclosed technology.

Turning to FIG. 6, an electronic device 600 including operational units 602-612 arranged to perform various operations of the presently disclosed technology is shown. The operational units 602-612 of the device 600 are implemented by hardware or a combination of hardware and software to carry out the principles of the present disclosure. It will be understood by persons of skill in the art that the operational units 602-612 described in FIG. 65 may be combined or separated into sub-blocks to implement the principles of the present disclosure. Therefore, the description herein supports any possible combination or separation or further definition of the operational units 602-612.

In one implementation, the electronic device 600 includes a display unit 602 to display information, such as a graphical user interface, and a processing unit 604 in communication with the display unit 602 and an input unit 606 to receive data from one or more input devices or systems, such as the localizer 102. Various operations described herein may be implemented by the processing unit 604 using data received by the input unit 606 to output information for display using the display unit 602.

Additionally, in one implementation, the electronic device 600 includes an encoding unit 608, a registration unit 610, and a localization unit 612. The encoding unit 608 encodes and compresses a raw image of a target surface captured using an imaging system into a template using at least one transform. The registration unit 610 aligns and registers the template with a reference templates matched from a gallery, and the localization unit 612 determines a location of the target surface and other travel information for a vehicle based on the registration of the template with the reference template.

In another implementation, the electronic device 600 includes units implementing the operations described with respect to FIG. 5. For example, the operation 504 may be implemented by the encoding unit 608, the operation 506 may be implemented by the registration unit 610, and the operation 508 may be implemented by the localization unit 612.

Figure 7:
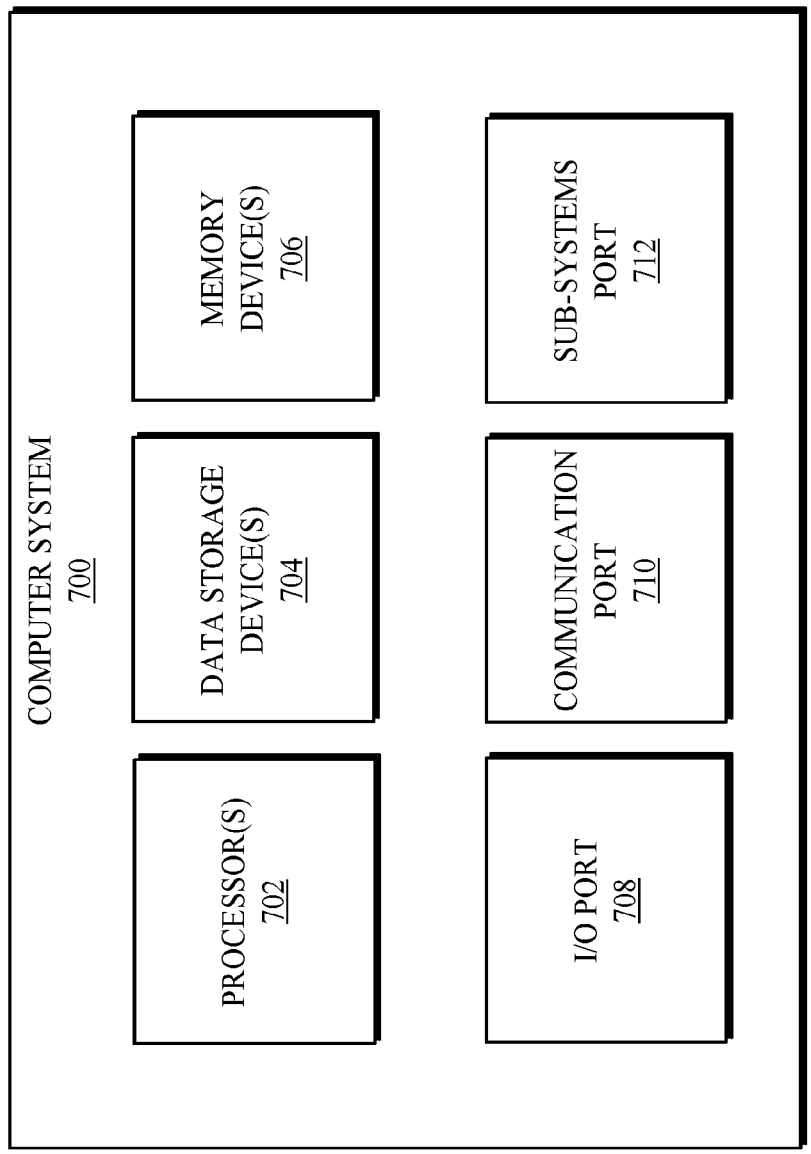
FIG. 7 is an example computing system that may implement various systems and methods of the presently disclosed technology.

Referring to FIG. 7, a detailed description of an example computing system 700 having one or more computing units that may implement various systems and methods discussed herein is provided. The computing system 700 may be applicable to the localizer 102 and other computing or network devices. It will be appreciated that specific implementations of these devices may be of differing possible specific computing architectures not all of which are specifically discussed herein but will be understood by those of ordinary skill in the art.

The computer system 700 may be a computing system is capable of executing a computer program product to execute a computer process. Data and program files may be input to the computer system 700, which reads the files and executes the programs therein. Some of the elements of the computer system 700 are shown in FIG. 7, including one or more hardware processors 702, one or more data storage devices 704, one or more memory devices 708, and/or one or more ports 708-712. Additionally, other elements that will be recognized by those skilled in the art may be included in the computing system 700 but are not explicitly depicted in FIG. 7 or discussed further herein. Various elements of the computer system 700 may communicate with one another by way of one or more communication buses, point-to-point communication paths, or other communication means not explicitly depicted in FIG. 7.

The processor 702 may include, for example, a central processing unit (CPU), a microprocessor, a microcontroller, a digital signal processor (DSP), and/or one or more internal levels of cache. There may be one or more processors 702, such that the processor 702 comprises a single central-processing unit, or a plurality of processing units capable of executing instructions and performing operations in parallel with each other, commonly referred to as a parallel processing environment.

The computer system 700 may be a conventional computer, a distributed computer, or any other type of computer, such as one or more external computers made available via a cloud computing architecture. The presently described technology is optionally implemented in software stored on the data stored device(s) 704, stored on the memory device (s) 706, and/or communicated via one or more of the ports 708-712, thereby transforming the computer system 700 in FIG. 7 to a special purpose machine for implementing the operations described herein. Examples of the computer system 700 include personal computers, terminals, workstations, mobile phones, tablets, laptops, personal computers, multimedia consoles, gaming consoles, set top boxes, and the like.

The one or more data storage devices 704 may include any non-volatile data storage device capable of storing data generated or employed within the computing system 700, such as computer executable instructions for performing a computer process, which may include instructions of both application programs and an operating system (OS) that manages the various components of the computing system 700. The data storage devices 704 may include, without limitation, magnetic disk drives, optical disk drives, solid state drives (SSDs), flash drives, and the like. The data storage devices 704 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 706 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 704 and/or the memory devices 706, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 700 includes one or more ports, such as an input/output (I/O) port 708, a communication port 710, and a sub-systems port 712, for communicating with other computing, network, or vehicle devices. It will be appreciated that the ports 708-712 may be combined or separate and that more or fewer ports may be included in the computer system 700.

The I/O port 708 may be connected to an I/O device, or other device, by which information is input to or output from the computing system 700. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 700 via the I/O port 708. Similarly, the output devices may convert electrical signals received from computing system 700 via the I/O port 708 into signals that may be sensed as output by a human, such as sound, light, and/or touch. The input device may be an alphanumeric input device, including alphanumeric and other keys for communicating information and/or command selections to the processor 702 via the I/O port 708. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 700 via the I/O port 708. For example, an electrical signal generated within the computing system 700 may be converted to another type of signal, and/or vice-versa. In one implementation, the environment transducer devices sense characteristics or aspects of an environment local to or remote from the computing device 700, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 700, such as, physical movement of some object (e.g., a mechanical actuator), heating or cooling of a substance, adding a chemical substance, and/or the like.

In one implementation, a communication port 710 is connected to a network by way of which the computer system 700 may receive network data useful in executing the methods and systems set out herein as well as transmitting information and network configuration changes determined thereby. Stated differently, the communication port 710 connects the computer system 700 to one or more communication interface devices configured to transmit and/or receive information between the computing system 700 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 710 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 710 may communicate with an antenna or other link for electromagnetic signal transmission and/or reception. In some examples, an antenna may be employed to receive Global Positioning System (GPS) data to facilitate determination of a location of a machine, vehicle, or another device.

The computer system 700 may include a sub-systems port 712 for communicating with one or more systems related to a vehicle to control an operation of the vehicle and/or exchange information between the computer system 700 and one or more sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

In an example implementation, localization information and software and other modules and services may be embodied by instructions stored on the data storage devices 704 and/or the memory devices 706 and executed by the processor 702. The computer system 700 may be integrated with or otherwise form part of a vehicle. In some instances, the computer system 700 is a portable device that may be in communication and working in conjunction with various systems or sub-systems of a vehicle.

The present disclosure recognizes that the use of such information may be used to the benefit of users. For example, the location information of a vehicle may be used to provide targeted information concerning a "best" path or route to the vehicle and to avoid surface hazards. Accordingly, use of such information enables calculated control of an autonomous vehicle. Further, other uses for location information that benefit a user of the vehicle are also contemplated by the present disclosure.

Users can selectively block use of, or access to, personal data, such as location information. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices.

The system set forth in FIG. 7 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
    identifying reference information from a gallery corresponding to drivable regions within a geographic area defined based on a location of a charging station, the reference information identified based on location information for a vehicle in communication with the charging station;
    obtaining the reference information from the charging station at the vehicle;
    capturing an image of a target surface using at least one imager;
    comparing the image to the reference information; and
    identifying travel information corresponding to the target surface based on a match between the image and the reference information.

2. The method of claim 1, wherein the travel information includes a location of the target surface.

3. The method of claim 1, further comprising:
    controlling at least one operation of the vehicle based on the travel information.

4. The method of claim 1, further comprising:
    outputting the travel information for presentation on a display.

5. The method of claim 1, wherein the location information for the vehicle includes at least one of a previous location of the vehicle or a path of travel for the vehicle.

6. The method of claim 1, wherein the travel information includes an orientation of the vehicle.

7. The method of claim 1, wherein the travel information includes at least one of road network information, vehicle information, pedestrian information, or weather information.

8. One or more tangible non-transitory computer-readable storage media storing computer-executable instructions for performing a computer process on a computing system, the computer process comprising:
    identifying reference information from a gallery corresponding to drivable regions within a geographic area defined based on a location of a charging station, the gallery including one or more images, the reference information identified based on location information for a vehicle in communication with the charging station;
    obtaining the reference information from the charging station; and
    identifying travel information based on the reference information.

9. The one or more tangible non-transitory computer-readable storage media of claim 8, wherein the travel information includes a location of the vehicle.

10. The one or more tangible non-transitory computer-readable storage media of claim 8, the computer process further comprising:
    controlling at least one operation of the vehicle based on the travel information.

11. The one or more tangible non-transitory computer-readable storage media of claim 8, the computer process further comprising:
    outputting the travel information for presentation on a display.

12. The one or more tangible non-transitory computer-readable storage media of claim 8, wherein the location information for the vehicle includes at least one of a previous location of the vehicle or a path of travel for the vehicle.

13. The one or more tangible non-transitory computer-readable storage media of claim 8, wherein the travel information includes an orientation of the vehicle.

14. The one or more tangible non-transitory computer-readable storage media of claim 8, wherein the travel information includes at least one of road network information, vehicle information, pedestrian information, or weather information.

15. A system comprising:
    a communication interface of a vehicle configured to communicate with a charging station when the vehicle is charging using the charging station;
    one or more storage media storing reference information, the reference information obtained from a gallery corresponding to drivable regions within a geographic area defined based on a location of a charging station, the gallery including image data, the reference information identified based on location information for the vehicle;

at least one processor identifying travel information based on the reference information.

16. The system of claim 15, wherein the travel information includes an orientation of the vehicle.

17. The system of claim 15, wherein the travel information includes a location of the vehicle.

18. The system of claim 15, wherein at least one operation of the vehicle is controlled based on the travel information.

19. The system of claim 15, wherein the reference information includes reference templates.

20. The system of claim 15, wherein the location information for the vehicle includes at least one of a previous location of the vehicle or a path of travel for the vehicle.

* * * * *